United States Patent
Menikoff

(10) Patent No.: US 9,262,812 B2
(45) Date of Patent: Feb. 16, 2016

(54) METHOD FOR REDUCING ROW AND COLUMN NOISE IN IMAGING SYSTEMS

(71) Applicant: BAE Systems Information and Electronic Systems Integration Inc., Nashua, NH (US)

(72) Inventor: Arthur Menikoff, Boxborough, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/824,378

(22) Filed: Aug. 12, 2015

(65) Prior Publication Data

US 2015/0348240 A1 Dec. 3, 2015

Related U.S. Application Data

(62) Division of application No. 13/606,320, filed on Sep. 7, 2012, now Pat. No. 9,135,680.

(60) Provisional application No. 61/532,263, filed on Sep. 8, 2011.

(51) Int. Cl.
    *G06T 5/00* (2006.01)
    *G06T 5/40* (2006.01)
    *H04N 5/365* (2011.01)
    *G06T 5/20* (2006.01)

(52) U.S. Cl.
    CPC . *G06T 5/002* (2013.01); *G06T 5/20* (2013.01); *G06T 5/40* (2013.01); *H04N 5/3651* (2013.01); *G06T 2207/20012* (2013.01); *G06T 2207/20182* (2013.01)

(58) Field of Classification Search
    None
    See application file for complete search history.

(56) References Cited

U.S. PATENT DOCUMENTS

| | | | | |
|---|---|---|---|---|
| 5,065,444 A * | 11/1991 | Garber | ...... | G06T 5/20 348/E5.035 |
| 5,617,461 A * | 4/1997 | Schreiner | ...... | H04N 5/21 348/E5.077 |
| 2010/0220193 A1* | 9/2010 | Hogasten | ...... | H04N 5/3658 348/164 |
| 2012/0039544 A1* | 2/2012 | Olsson | ...... | G06T 5/002 382/263 |
| 2013/0022279 A1* | 1/2013 | Hogasten | ...... | H04N 5/3658 382/218 |
| 2013/0064449 A1* | 3/2013 | Menikoff | ...... | G06T 5/002 382/168 |
| 2013/0321674 A1* | 12/2013 | Cote | ...... | H04N 9/64 348/242 |
| 2014/0016879 A1* | 1/2014 | Hogasten | ...... | H04N 5/33 382/264 |
| 2014/0240512 A1* | 8/2014 | Hogasten | ...... | H04N 5/2257 348/164 |
| 2015/0334315 A1* | 11/2015 | Teich | ...... | H04N 5/2257 348/164 |

OTHER PUBLICATIONS

Scribner, D.A. et al., "Nonuniformity Correction for Staring IR Focal Plane Arrays Using Scene-Based Techniques", SPIE, 1990, pp. 224-233, vol. 1308.

(Continued)

*Primary Examiner* — Sean Motsinger
(74) *Attorney, Agent, or Firm* — Kimberly A. Peaslee; Upton & Hatfield LLP; Maine Cernota Rardin

(57) ABSTRACT

A method for the reduction of noise in an image including identifying neighboring pixel values in pixels proximate to a subject pixel; comparing the neighboring pixel values to a preset tolerance range; using neighboring pixel values within the tolerance range to calculate a pixel intensity correction value; and applying the pixel intensity value to the subject pixel.

4 Claims, 4 Drawing Sheets

(56) References Cited

OTHER PUBLICATIONS

Rossi, Alessandro et al., "A Comparison of Deghosting Techniques in Adaptive Nonuniformity Correction for IR Focal-Plane Array Systems", Proc. of SPIE, 2010, 10 pgs., vol. 7834.

Harris, John G. et al., "Minimizing the "Ghosting" Artifact in Scene-Based Nonuniformity Correction", SPIE, Apr. 1998, pp. 106-113, vol. 3377.

* cited by examiner

METHOD FOR REDUCING ROW AND COLUMN NOISE IN IMAGING SYSTEMS

RELATED APPLICATIONS

This is a divisional of U.S. application Ser. No. 13/606,320 filed Sep. 7, 2012 and claims the benefit of U.S. Provisional Application No. 61/532,263 filed on Sep. 8, 2011. This application is herein incorporated by reference in its entirety for all purposes.

FIELD OF THE INVENTION

The present application relates to imaging systems and more particularly to noise reduction in imaging systems.

BACKGROUND OF THE INVENTION

One of the most common problems with detector array based imaging systems, especially those that use un-cooled arrays, is noise. In such systems, minor hardware defects can cause a noise bias causing "blinking stripes" to appear along columns, rows, or both in the field of view (FOV). These flashing stripes impede performance of the imaging system by partially obscuring viewed objects and, in a night vision goggle or weapon sight application, can be distracting and cause headaches for the user. Unfortunately, because this noise is random, rather than fixed in time, it cannot be calibrated out of the image through the use of traditional offsets.

A need therefore exists for a method of reducing row and column noise in imaging systems.

SUMMARY OF THE INVENTION

One embodiment of the present invention provides a method for the reduction of noise in an image, the method comprising: identifying a homogeneous set of pixels near a subject pixel in a pixel group wherein each homogenous pixel in the homogenous set of pixels has a difference in pixel intensity value of the homogenous pixel and pixel intensity of each other homogenous pixel in the homogenous set of pixels is within a preset tolerance; calculating a pixel intensity correction value by taking the difference between an average pixel intensity of the homogenous set of pixels and pixel intensity of the subject pixel; averaging the pixel intensity correction over the pixel group; applying the pixel intensity correction to the subject pixel.

Another embodiment of the present invention provides such a method wherein the pixel group is a group of pixels having a common effect on degradation of the image.

A further embodiment of the present invention provides such a method wherein the pixel group is a row of pixels.

Yet another embodiment of the present invention provides such a method wherein the pixel group is a column of pixels.

One embodiment of the present invention provides a method for removal of column noise in an image, the method comprising: identifying columns proximate to a subject column; calculating maximum, minimum, mean value and the center column pixel intensity values of each column proximate to the subject pixel; calculating the difference between the maximum and minimum intensities of each column proximate to the subject column; comparing the difference to a tolerance range for the each column proximate to the subject column, and if the difference is within the tolerance range, the difference between the mean column pixel intensity and the center column pixel intensity is added to accumulated offset estimate; dividing the accumulated offset estimate by the number of the columns proximate to the subject column for which the difference is within the tolerance range to yield a column offset; and applying the column offset to reduce column noise.

Another embodiment of the present invention provides such a method wherein the tolerance value is determined by an image histogram.

A further embodiment of the present invention provides such a method wherein the tolerance is set to the width of a peak of the histogram at preset a ratio of a height of the histogram.

Still another embodiment of the present invention provides such a method wherein the ratio is about approximately 50%.

One embodiment of the present invention provides a method for the reduction of row noise, the method comprising: Filtering columns of pixels through a low pass filter; Computing row offset from average row differences of rows for which a count of valid filter updates exceed a preset threshold; and Updating the image with the row offset.

Another embodiment of the present invention provides such a method wherein the valid update is an update of the low pass filter where the difference between a first column filter values and a first column intensity is less than a tolerance value.

A further embodiment of the present invention provides such a method wherein the tolerance value is determined by an image histogram.

Still another embodiment of the present invention provides such a method wherein the tolerance is set to the width of a peak of the histogram at preset a ratio of a height of the histogram.

A still further embodiment of the present invention provides such a method wherein the ratio is about approximately 50%.

Even another embodiment of the present invention provides such a method.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
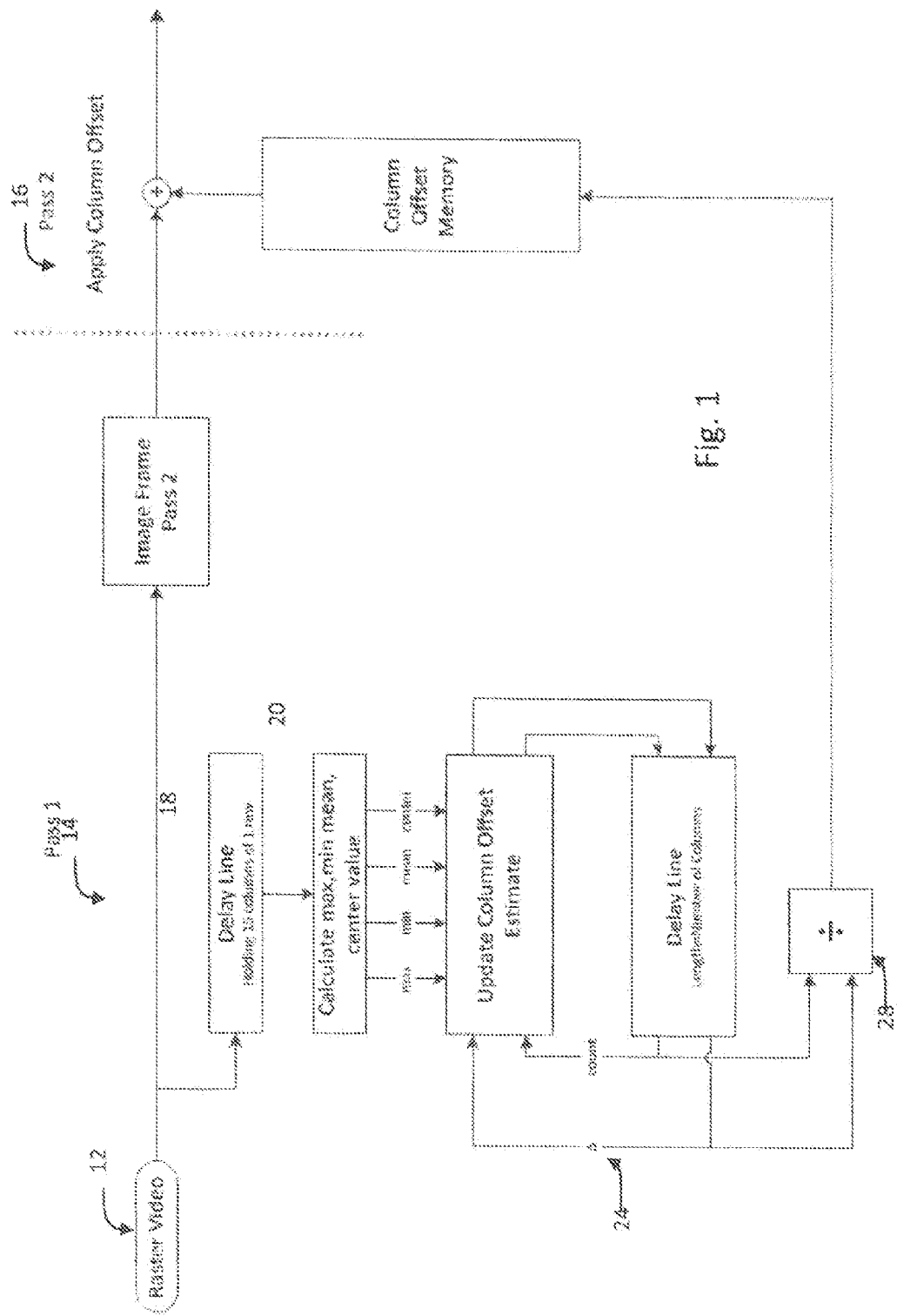
FIG. 1 is a flow chart illustrating a method for the correction of column noise configured in accordance with one embodiment of the present invention.

One embodiment of the present, invention provides a system and method to remove noise from focal plane arrays (FPA). Two types of noise are addressed by the embodiments of the present invention: column noise and row noise. Column noise is the appearance of vertical streaks in imagery. The vertical streaks occur because the average light intensity level of each column in the array is different. This type of noise may occur in uncooled IR focal plane arrays and other area image detectors. The column intensity offsets of the array vary temporally and are also uncorrelated temporally so that these offsets cannot be removed by a factory calibration but are required to be corrected on the fly independently for each image frame. In order for the FPA to be used for live video, the column noise must be removed in real time and with a small enough processing delay so as not be noticeable by the viewer of the video. In order for the column noise reduction system to be used for portable video cameras, the system must be amenable to a simple implementation on a minimal amount of hardware such as a single IC or FPGA.

The system of one embodiment, of the present invention shall operate on single image frames. The system, in one embodiment, estimates the column noise offset correction of a column by the difference of the average intensity level of the column compared to the average intensity of its neighboring columns. However, images typically have a smaller number of bright objects within a relatively uniform background. The bright objects will distort the column averages and appear to bleed into the background if the straight forward implementation of column averages were to be applied. Embodiments of the claimed invention modify the method of column averages by separating out the background and applying the method only to the parts of columns in the image background.

In one embodiment of the claimed invention, the system shall operate on video outputs that are read in raster format, i.e. one row at a time. As a row of video is read, an estimate of the column offset correction will be calculated and a count the number of rows for which valid offsets were calculated. The final column offset correction is the average of the valid offsets for the column being considered. For each row and a particular column, a certain number of columns to the left and right of the particular column are examined. The certain number of columns to be considered, which is a number such as eight on each side of the particular column, depends the noise level of the detector and the amount of averaging that is desired. A column offset estimate wall be calculated only if the difference between the maximum and minimum intensity is below a certain threshold (to be determined below). The estimated column offset is the difference between the average of the neighboring column pixels and the particular column being considered. The restriction to only columns whose neighbors and itself are within a certain tolerance is to ensure that only background pixels are used in the column offset estimation.

Figure 4:
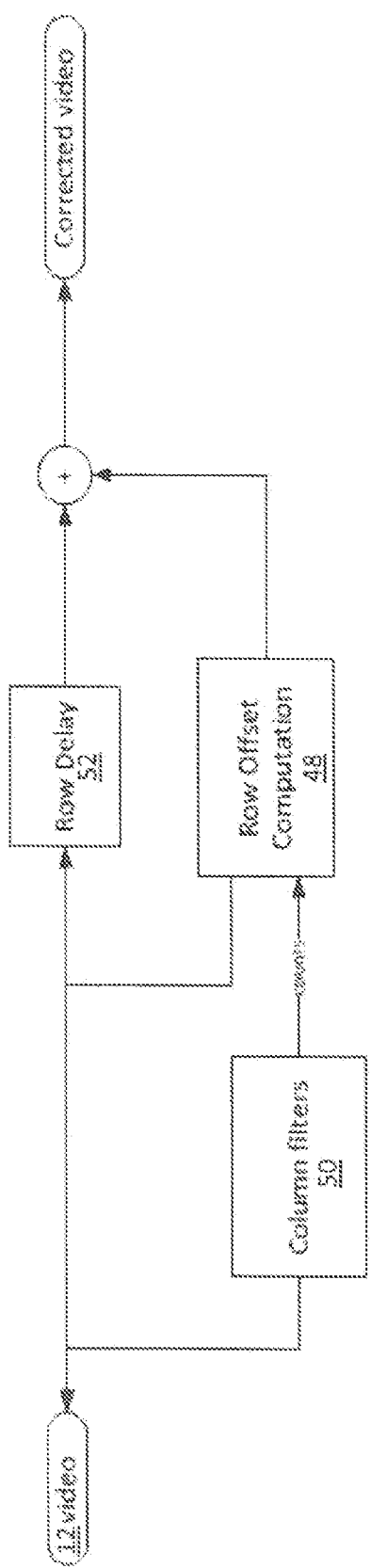
FIG. 4 is a flow chart illustrating a method for the correction of row noise configured in accordance with one embodiment of the present invention.

One embodiment of the present invention has a piped-lined implementation suitable for ICs or FPGAs. A block diagram of the piped-line CNR system is shown in FIG. 1. The input to the system is raster format video 12. The system calculates column offsets on one pass 14 and applies the offsets on a next pass of the data 16. Since applying offsets takes a negligible amount of time and can be overlapped with other unrelated processing, the system, in one embodiment delays the imagery by one frame. The video data enters a delay line 18 whose length is one more than the number of neighboring columns to evaluate. From the contents of the delay memory, the maximum, minimum, mean value and the center column intensity are calculated 20. All of these calculations can be done pipelined with standard processing. An addition delay line 22 is used to hold the accumulated offset estimates and the count of the valid estimates. The size of the memory for this delay line 22 is the number of columns in the video data. When the difference 24 between the maximum and the minimum of the first delay line is under the tolerance, then the difference between the mean and the center column pixel is added to the accumulated offset estimates and further the count of valid estimates for the column is incremented 26. If the difference between max and rain is out of tolerance, then the accumulated offset estimate and count is left unchanged. After all rows have been processed, then for the columns for which there are a minimum number of counts, the accumulated sum of offsets is divided by the total number of counts and stored in memory 28. Since the divisor is at most the number of rows in a frame, the division by count can be done as a multiply by table lookup. Likewise the average column intensities in the first step can be calculated by multiplying by the inverse of the number of neighborhood columns or rows 46, as illustrated in FIG. 4 with regard to row intensity. Alternatively, a power of two number of columns may be used so that the divide to calculate means can be implemented as a shift. The memory requirements for the processing are one frame of data for downstream processing, two row lengths of memory for accumulated offset estimates and the offset to be applied on the next pass and the length of the first delay line of neighboring columns.

A tolerance value is used in one embodiment of the present invention to determine when a group of pixels are all background pixels. The tolerance valued used by one embodiment of the present invention is determined from the image histogram. The performance of one embodiment of the present invention depends weakly on the tolerance value used and is slowly varying with time. Therefore, the tolerance can be calculated slowly as a background process with minimal computational load and without loss of performance.

The first step in calculating the tolerance value is to form a histogram of pixel intensities. The intensity at which the histogram is peak is found. Then the tolerance is set to the width of the histogram peak at nominally 50% of the peak height. The tolerance is not allowed to fall below a minimum threshold level. The ratio of the width level to the peak level is set base on the particular noise characteristics of the FPA for which it is to be used. Care must be taken not to confuse single peak with double peaks and set the tolerance excessively high.

Figure 2:
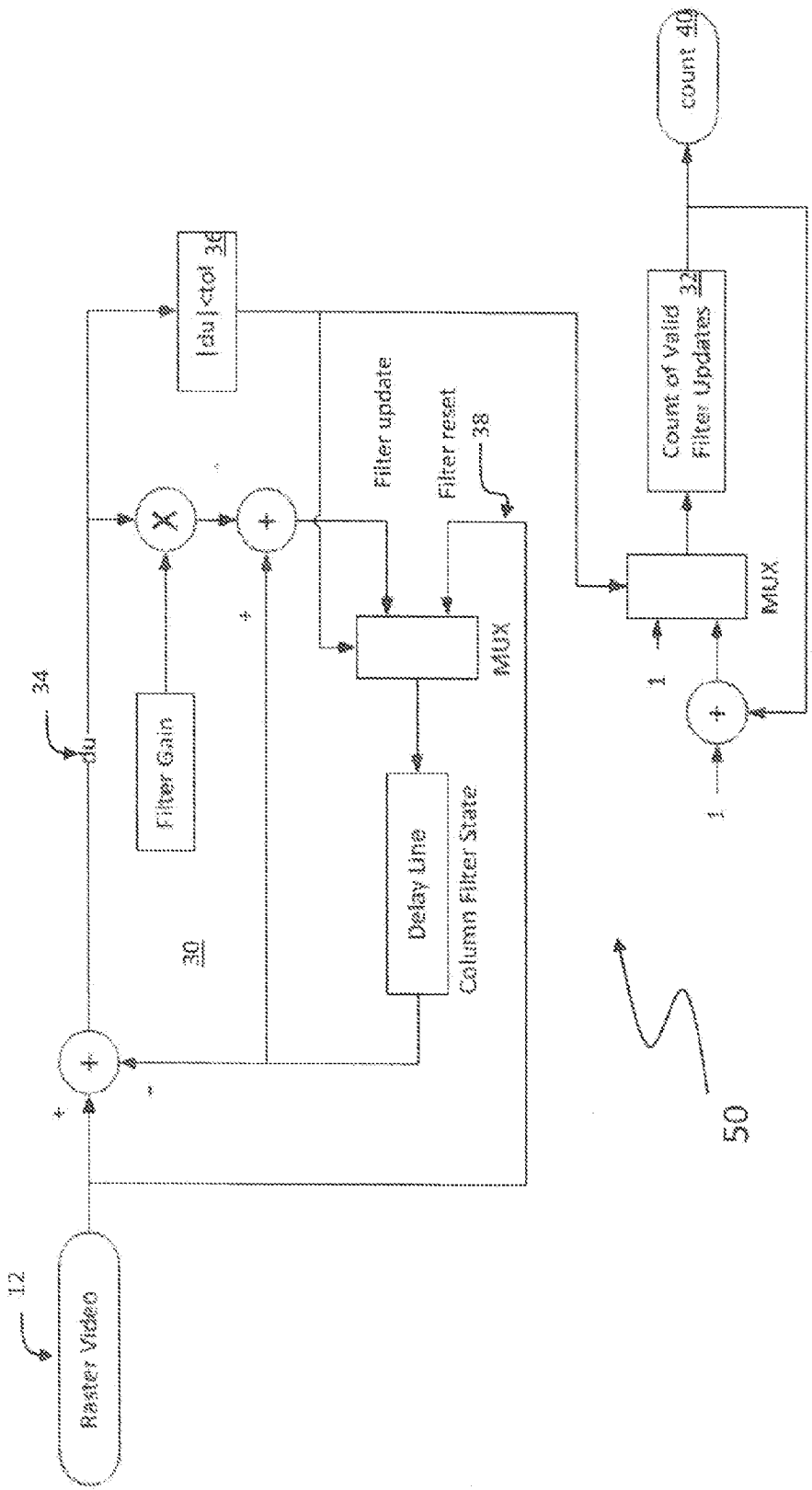
FIG. 2 is a flow chart illustrating a method for column filtering for a row noise reduction method configured in accordance with one embodiment of the present invention.

As illustrated in FIG. 2, the row noise reduction embodiment uses the same idea as the column noise reduction system but is modified in order that it may be pipelined for raster video input data 12. The row noise reduction embodiment uses the same tolerance value derived from image histograms that one embodiment of the present invention uses. The system uses a collection of first order low pass filters, one for each column 30. The low pass filters are initialized to the intensities of the first row. In addition, an array of counts 32 of the number of valid filter updates is initialized to one for all columns. The system proceeds to process the video data one row at a time. A row of video data is input and the difference 34 between the current column filter values and the current column intensity is calculated.

For each column, the following processing carried out. If the magnitude of the difference between the current filter output and the current pixel value 36 is under the tolerance value then the filter is updated and the count of valid updates 32 is incremented by one. On the other hand, if the magnitude of the difference between current filter output and current pixel value is above the tolerance, the filter is reset 38 to the current pixel value and the count of valid pixels is reset to one. A count 40 is made of the number of columns for which the number of valid filter updates exceeds a certain value.

Figure 3:
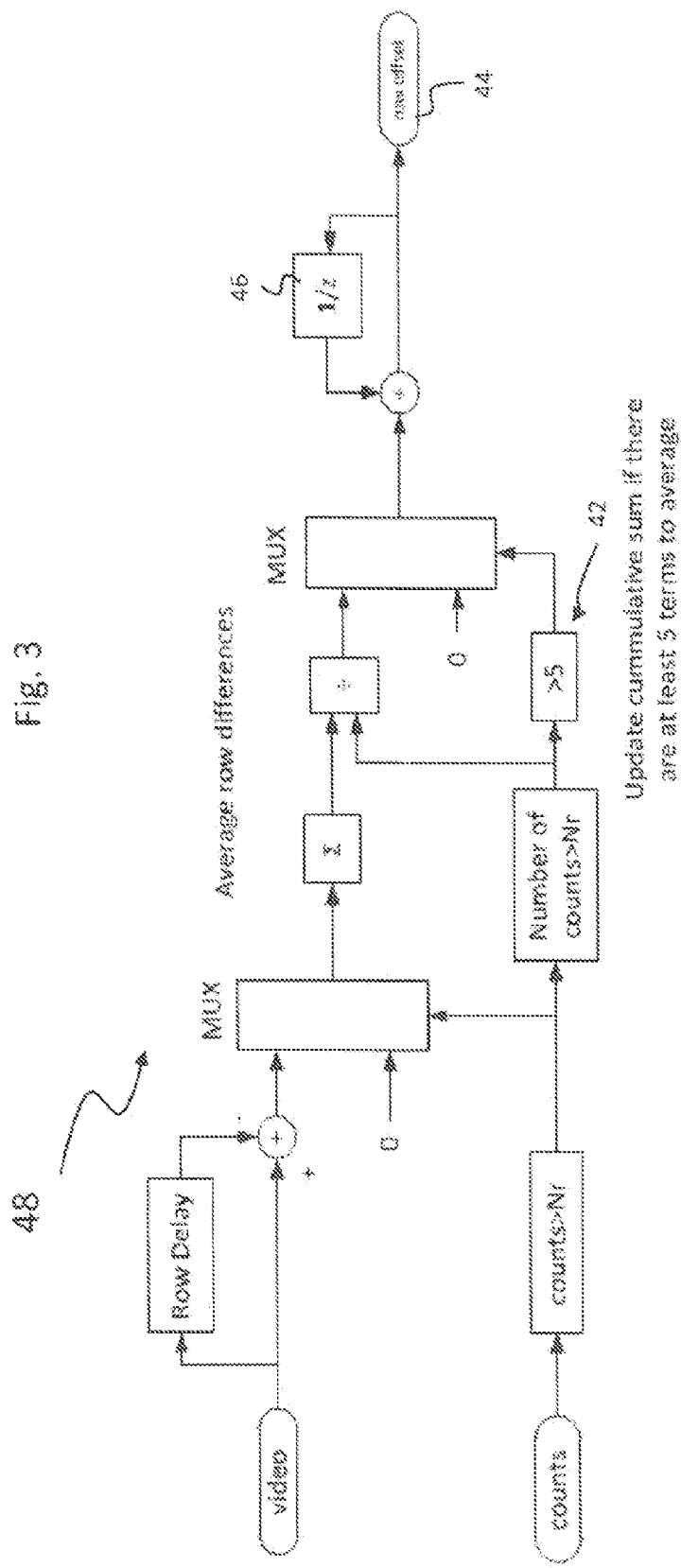
FIG. 3 is a flow chart illustrating a method for row offset computation for a row noise reduction method configured in accordance with one embodiment of the present invention.

If in one embodiment, illustrated in FIG. 3 there are number of columns 42 for which the number of valid filter updates exceeds a certain value, for instance 5 columns, then the difference between the pixel values of the current and previous row is averaged for all the columns that have their number of valid filter inputs exceeding the preset value. This average is added to the accumulated sum of previous row differences. If there were too few rows to compute the average difference, then the accumulated sum is left unchanged. The accumulated sum is then subtracted from the pixel values of the row to remove the row noise.

The pipelined implementation of the row noise reduction embodiment is shown in FIGS. 3 and 4. The pipelined system requires three rows of memory to hold the previous row of video, the column filter states and the counts of number of valid column filter updates. The row offset can be applied in a single pass because a row of video 12 is Stored in memory 52 while the offset is calculated. When the calculation is complete, the offset can be subtracted from the saved row and output with a delay equivalent to the tune to scan a video row.

The foregoing description, of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for the redaction of noise in an image, said method comprising:
   identifying a homogeneous set of pixels near a subject pixel in a pixel group wherein each homogenous pixel in said homogenous set of pixels has a difference in pixel intensity value of said homogenous pixel and pixel intensity of each other homogenous pixel in said homogenous set of pixels is within a preset tolerance;
   calculating a pixel intensity correction value by taking the difference between an average pixel intensity of said homogenous set of pixels and pixel intensity of said subject pixel;
   averaging said pixel intensity correction over said pixel group;
   applying said pixel intensity correction to said subject pixel.

2. The method of claim 1 wherein said pixel group is a group of pixels having a common effect on degradation of said image.

3. The method of claim 1 wherein said pixel group is a row of pixels.

4. The method of claim 1 wherein said pixel group is a column of pixels.

* * * * *